United States Patent
Zhou et al.

(10) Patent No.: US 10,425,886 B2
(45) Date of Patent: Sep. 24, 2019

(54) METHOD AND APPARATUS FOR INDICATING TYPE OF PARTICIPATING SERVICE PROVIDER IDENTITY

(71) Applicant: Baicells Technologies Co. Ltd., Beijing (CN)

(72) Inventors: Mingyu Zhou, Beijing (CN); Lixin Sun, Beijing (CN); Yingzhe Ding, Beijing (CN)

(73) Assignee: Baicells Technologies Co. Ltd., Beijing (CN)

( * ) Notice: Subject to any disclaimer, the term of this patent is extended or adjusted under 35 U.S.C. 154(b) by 0 days.

(21) Appl. No.: 16/312,392

(22) PCT Filed: Jun. 21, 2017

(86) PCT No.: PCT/CN2017/089348
§ 371 (c)(1),
(2) Date: Dec. 21, 2018

(87) PCT Pub. No.: WO2017/219978
PCT Pub. Date: Dec. 28, 2017

(65) Prior Publication Data
US 2019/0239146 A1    Aug. 1, 2019

(30) Foreign Application Priority Data
Jun. 24, 2016  (CN) .......................... 2016 1 0473846

(51) Int. Cl.
*H04W 48/16* (2009.01)
*H04W 48/08* (2009.01)

(52) U.S. Cl.
CPC ........... *H04W 48/16* (2013.01); *H04W 48/08* (2013.01)

(58) Field of Classification Search
CPC ..... H04W 48/08; H04W 76/10; H04W 76/11; H04W 36/0033; H04W 36/0066;
(Continued)

(56) References Cited

U.S. PATENT DOCUMENTS 6,473,503 B1 * 10/2002 Karau ............... H04M 3/42144
                                                        379/221.13
6,480,861 B1 * 11/2002 Kanevsky ................. G06F 9/50
(Continued)

FOREIGN PATENT DOCUMENTS

WO    2015119472 A1    8/2015

OTHER PUBLICATIONS

"Chinese Application Serial No. 201610473846.6, Office Action dated Apr. 30, 2019", 15 pgs.

*Primary Examiner* — Nizar N Sivji
(74) *Attorney, Agent, or Firm* — Kwan & Olynick LLP

(57) ABSTRACT

A method and an apparatus for indicating a type of a PSP-ID are provided. The method includes: generating a system message by an access device, wherein the system message includes multiple PSP-IDs, PSP-IDs of a same type among the multiple PSP-IDs are sequentially arranged, and different types of PSP-IDs among the multiple PSP-IDs are arranged according to a preset sequential order, and the system message further includes indication information for each type of PSP-IDs, and the indication information is used for indicating a location of each type of PSP-IDs; and transmitting the system message by the access device.

18 Claims, 3 Drawing Sheets

(58) Field of Classification Search
CPC ......... H04W 48/16; H04W 8/16; H04W 4/38;
H04W 80/04; H04W 48/14; H04W 48/18;
H04W 4/20; G07C 9/00031; H04N
1/00307; H04N 13/194; H04L 49/90;
H04L 45/745; H04L 47/125; H04L
47/6255; H04L 29/12367; H04L 5/0048;
H04L 61/2514; H04L 43/0876; H04L
67/2814; G06F 16/9535; G06F 21/16;
G06F 16/27; G06F 16/51; G06F 16/5866;
G06F 16/20; G06F 3/064; H04H 60/46
See application file for complete search history.

(56) References Cited

U.S. PATENT DOCUMENTS

| | | | | |
|---|---|---|---|---|
| 6,871,069 | B1* | 3/2005 | Cho | ........................ H04W 8/06 |
| | | | | 455/432.1 |
| 2008/0253399 | A1 | 10/2008 | Wang et al. | |
| 2011/0286588 | A1* | 11/2011 | Kim | .................... H04M 1/2535 |
| | | | | 379/91.01 |
| 2012/0026971 | A1* | 2/2012 | Khandelia | ........... H04W 36/005 |
| | | | | 370/331 |
| 2016/0328484 | A1* | 11/2016 | Temby | ............... G06Q 30/0251 |

* cited by examiner

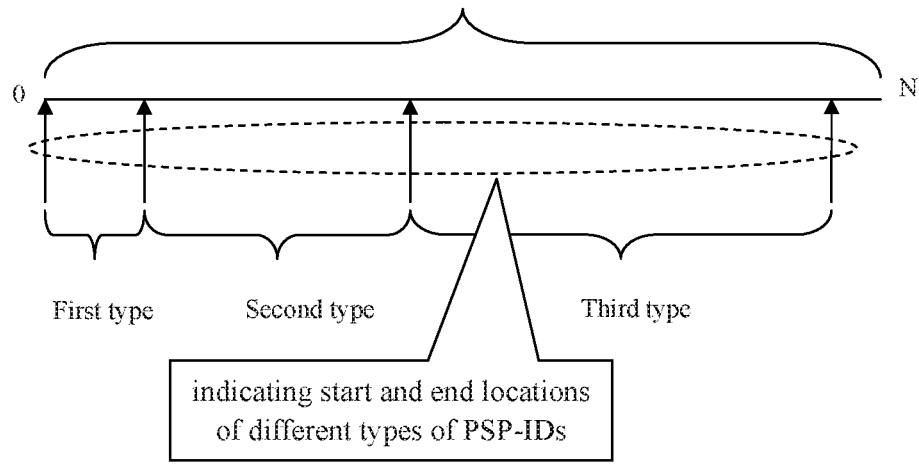
Fig.4
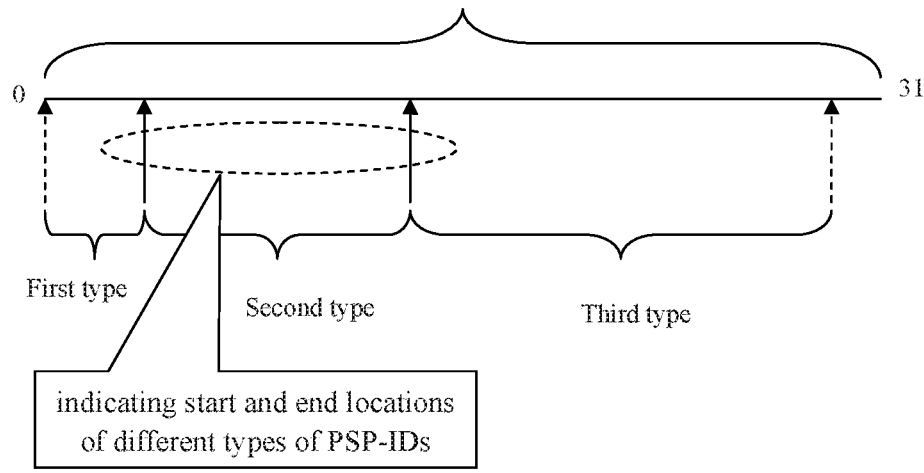
Fig.5
receiving, by a UE, a system message transmitted by an access device — S601
Fig.6

METHOD AND APPARATUS FOR INDICATING TYPE OF PARTICIPATING SERVICE PROVIDER IDENTITY

CROSS-REFERENCE TO RELATED APPLICATION

The present application is a U.S. national phase application of a PCT Application No. PCT/CN2017/089348 filed on Jun. 21, 2017, which claims a priority of a Chinese Patent Application No. 201610473846.6 filed in China on Jun. 24, 2016, the disclosure of which is incorporated herein in its entirety by reference.

TECHNICAL FIELD

The present disclosure relates to the field of communication, and in particular to a method and apparatus for indicating a type of a Participating Service Provider Identity (PSP-ID).

BACKGROUND

MulteFire is a newly defined uplink transmission method based on a Licensed-Assisted Access (LAA) downlink transmission method in R13 of a Long Term Evolution (LTE), and the MulteFire may independently work in unlicensed frequency bands based on the LTE (i.e., stand-along LTE-U). The MulteFire may support two network access modes (also known as network services) which are a Public Land Mobile Network (PLMN) access mode and a Neutral Host Network (NHN) access mode. Of course, the MulteFire may also simultaneously support the two network access modes, i.e., a hybrid mode.

SUMMARY

Some embodiments of the present disclosure provide a method and apparatus for indicating a type of a PSP-ID, so as to solve a problem that overheads for indicating a type of a PSP-ID are overlarge.

In a first aspect, some embodiments of the present disclosure provide a method for indicating a type of a PSP-ID. The method includes: generating a system message by an access device, wherein the system message includes multiple PSP-IDs, PSP-IDs of a same type among the multiple PSP-IDs are sequentially arranged, and different types of PSP-IDs among the multiple PSP-IDs are arranged according to a preset sequential order, and the system message further includes indication information for each type of PSP-IDs, and the indication information is used for indicating a location of each type of PSP-IDs; and transmitting the system message by the access device.

In a second aspect, some embodiments of the present disclosure provide a method for indicating a type of a PSP-ID. The method for indicating a type of a PSP-ID is executed by a User Equipment (UE), and includes: receiving a system message transmitted by an access device, wherein the system message includes multiple PSP-IDs, PSP-IDs of a same type among the multiple PSP-IDs are sequentially arranged, and different types of PSP-IDs are arranged according to a preset sequential order, and the system message further includes indication information of each type of PSP-IDs, and the indication information is used for indicating a location of each type of PSP-IDs.

In a third aspect, some embodiments of the present disclosure provide an apparatus for indicating a type of a PSP-ID. The apparatus includes a processor, a storage, a network interface and a data bus, wherein the data bus is configured to connect the processor, the storage and the network interface together; the storage is configured to storing programs and codes; and the processor is configured to invoke the program and the codes stored by the storage so as to execute the method according to the first aspect.

In a fourth aspect, some embodiments of the present disclosure provide an apparatus for indicating a type of a PSP-ID. The apparatus includes a processor, a storage, a network interface and a data bus, wherein the data bus is configured to connect the processor, the storage and the network interface together; the storage is configured to storing programs and codes; and the processor is configured to invoke the program and the codes stored by the storage so as to execute the method according to the second aspect.

In some embodiments of the present disclosure, the access device generates the system message, the system message includes multiple PSP-IDs, PSP-IDs of a same type among the multiple PSP-IDs are sequentially arranged, and different types of PSP-IDs among the multiple PSP-IDs are arranged according to a preset sequential order, and the system message further includes indication information for each type of PSP-IDs, and the indication information is used for indicating a location of each type of PSP-IDs; and the access device transmits the system message. Compared with related art in which each PSP-ID needs to carry type indication information, some embodiments of the present disclosure may reduce overheads for indicating the type of the PSP-ID.

BRIEF DESCRIPTION OF THE DRAWINGS

In order to describe technical solutions provided by some embodiments of the present disclosure more clearly, drawings needing to be used in description of some embodiments or related art will be briefly introduced hereinafter. Obviously, the described drawings are only related to some embodiments of the present disclosure, and those of ordinary skills in the art may also acquire other drawings according to the drawings without any inventive work.

FIG. 4 is a location indication schematic diagram provided by some embodiments of the present disclosure;

FIG. 5 is another location indication schematic diagram provided by some embodiments of the present disclosure:

FIG. 6 is a flow diagram of another method for indicating a type of a PSP-ID provided by some embodiments of the present disclosure;

DETAILED DESCRIPTION

Technical solutions of some embodiments of the present disclosure will be described hereinafter clearly and completely in conjunction with the drawings of some embodiments of the present disclosure. Obviously, the described embodiments are only a part, rather than all, of embodiments of the present disclosure. Based on the embodiments in the present disclosure, all other embodiments obtained by one skilled in the art without any inventive work fall within the protection scope of the present disclosure.

Figure 1:
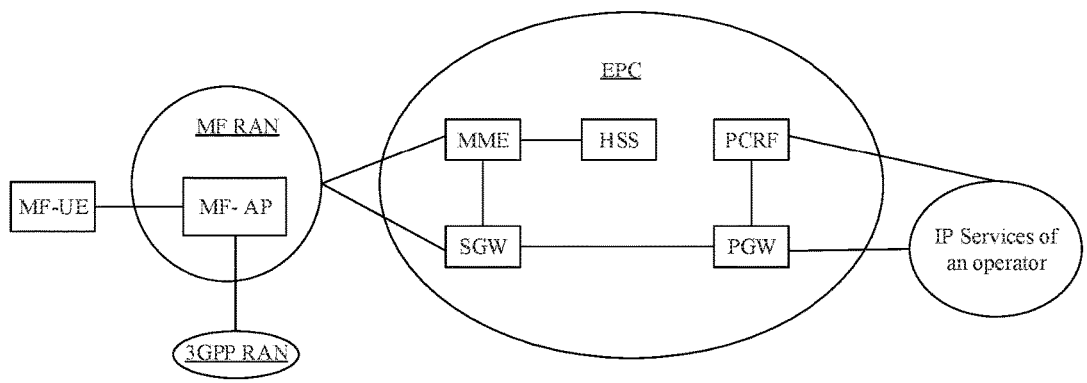
FIG. 1 is a system architecture diagram of a PLMN access mode.

A system architecture of a Public Land Mobile Network (PLMN) access mode may be shown in FIG. 1. A User Equipment (UE) of a MulteFire establishes communication with an Access Point (AP) in a Radio Access Network (RAN) of the MulteFire or an evolved Node B (eNB) in the RAN. The MulteFire is called MF for short, the UE of the MulteFire is called MF-UE for short, and the AP in the RAN of the MulteFire is called MF-AP for short. In addition, the RAN of the MulteFire may also establish communication with a Mobile Management Entity (MME) and a Serving Gateway (SGW) in an Evolved Packet Core network (EPC). In addition, the RAN of the MulteFire may also establish communication with a RAN of a 3rd Generation Partnership Project (3GPP), and the RAN of the 3GPP may also establish communication with the EPC. In the EPC, the MME may establish communication with a Home Subscriber Server (HSS), the SGW may establish communication with a PDN Gateway (PGW), the PGW may also establish communication with a Policy and Charging Rules Function (PCRF) unit, and the PGW and PCRF may also establish communication with an entity of Operator's IP Services.

Figure 2:
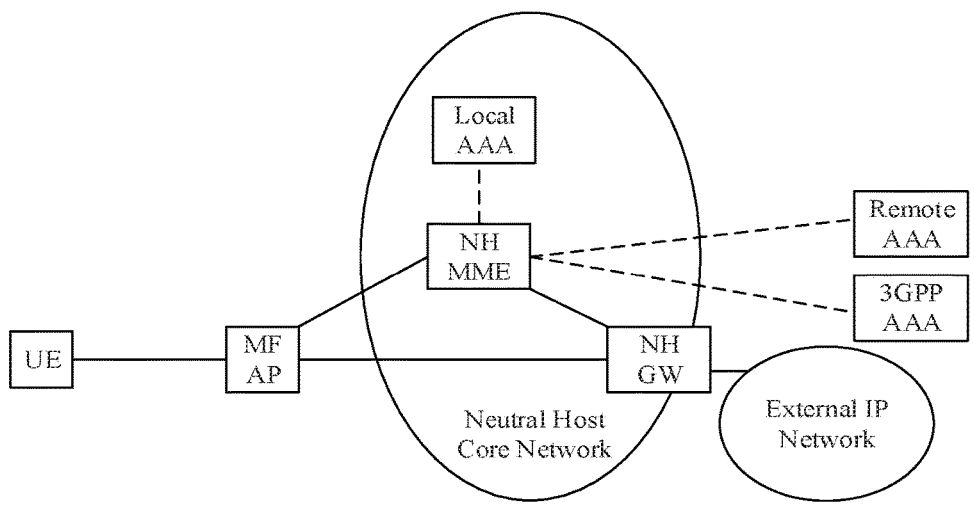
FIG. 2 is a system architecture diagram of an NHN access mode.

A system architecture of a Neutral Host Network (NHN) access mode may be shown in FIG. 2, the UE establishes communication with the MF-AP, and the MF-AP may also establish communication with the MME and a Gateway (GW) in a Neutral Host Core Network, wherein the MME in the Neutral Host Core Network is called NH MME for short, the GW in the Neutral Host Core Network is called NH GW for short, the NH MME may establish communication with a Local Authentication, Authorization and Accounting (Local AAA) entity in the Neutral Host Core Network, the NH MME may also establish communication with the NH GW and may also establish communication with a Remote AAA and a 3GPP AAA. In addition, the NH GW may also establish communication with an External IP network.

A network in the NHN access mode indicates different participating service providers through Participating Service Provider Identities (PSP-IDs) broadcasted in a System Information Block (SIB). A MF network in the NHN access mode supports multiple PSP-IDs, so as to support multiple service providers to share the MF network for providing services. Due to limitation of a size of the System Information Block, only a finite quantity of PSP-IDs may be broadcasted. For example, at most 31 PSP-IDs may be broadcasted in a System Information Block of the MulteFire (SIB_MF, also called as eSIB), and the PSP-IDs may also include different types of PSP-IDs. The different types of PSP-IDs are mainly indicated by a type indication carried in each of the PSP-IDs at present. For example, each of the PSP-IDs includes a 24-bit ID and a 2-bit type indication. Since each of the PSP-IDs carries one type indication, overheads for indicating the types of the PSP-IDs are overlarge.

In addition, some embodiments of the present disclosure may be applied to mobile communication technologies including, but not limited to, a Code Division Multiple Access 2000 (CDMA2000), a Wideband CDMA (WCDMA), a Time Division-Synchronous CDMA (TD-SCDMA), a Worldwide Interoperability for Microwave Access (WiMAX), a LTE/LTE-A, the LAA, the MulteFire, and fifth, sixth and N-th generations mobile communication technologies which may appear subsequently. The MulteFire to which some embodiments of the present disclosure is applied may include the NHN access mode, and some embodiments of the present disclosure may support a hybrid mode of the NHN access mode and the PLMN access mode while being applied to the MulteFire, which are not limited in some embodiments of the present disclosure.

In addition, in some embodiments of the present disclosure, the User Equipment (UE) may be a terminal product capable of supporting a communication protocol of a land mobile communication system and a wireless modem applied to specific communication, which may be integrated into various kinds of terminals such as a mobile phone, a tablet computer and a data card and achieve a communication function. For example, the UE may be the mobile phone, or other equipment that may send or receive a wireless signal, such as a personal digital assistant (PDA), a wireless modem, a wireless communication device, a handheld device, a laptop computer, a cordless telephone, a wireless local loop (WLL) station, a Customer Premise Equipment (CPE) or a mobile intelligent hotspot capable of transforming a mobile signal into a Wireless Fidelity (WiFi) signal, an intelligent household appliance, or other equipments that may autonomously communicate with the mobile communication network without artificial operation.

In some embodiments of the present disclosure, the access device may be a base station or an access point (AP). Obviously, it may be understood that a form the base station is not limited, and the base station may be a Macro Base Station, a Pico Base Station, a Node B (a mobile base station of third generation (3G)), an Enhanced Node B (ENB), a Femto eNB or a Home eNode B or a Home eNB or an HNEB, a relay station, a Remote Radio Unit (RRU) or a Remote Radio Head (RRH), etc.

In addition, in some embodiments of the present disclosure, each participating service provider may correspond to a PSP-ID, wherein the participating service provider may be understood as a service provider participating into a NHN access mode network of the MulteFire, and including, but not limited to, the Internet service provider, a cable television service provider, a mobile network operator or an enterprise and public place service provider.

Figure 3:
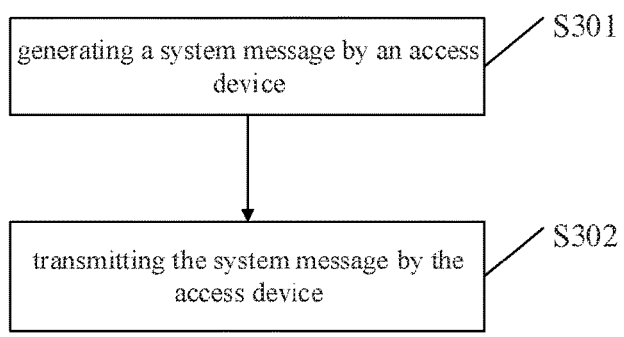
FIG. 3 is a flow diagram of a method for indicating a type of a PSP-ID provided by some embodiments of the present disclosure.

Referring to FIG. 3, FIG. 3 is a flow diagram of a method for indicating a type of a PSP-ID provided by some embodiments of the present disclosure. As shown in FIG. 3, the method includes the following steps S301 and S302.

S301: generating a system message by an access device, wherein the system message may include multiple participating service provider identities (PSP-IDs), PSP-IDs of a same type among the multiple PSP-IDs are sequentially arranged, and different types of PSP-IDs among the multiple PSP-IDs are arranged according to a preset sequential order; and the system message further includes indication information for each type of PSP-IDs, and the indication information is used for indicating a location of each type of PSP-IDs.

S302: transmitting the system message by the access device.

In some embodiments of the present disclosure, the system message includes, but not limited to, the SIB_MF system message. The system message may also be other system messages, such as a SIBX system message, wherein X is a natural number, such as 1, 2, 3, 4 and so on.

In some embodiments of the present disclosure, because the PSP-IDs of the same type among the multiple PSP-IDs are arranged sequentially and different types of PSP-IDs are arranged according to the preset sequential order, so that a location of each type of PSP-IDs may be identified by the indication information, and each type PSP-IDs may be identified, i.e., a type of each of the multiple PSP-IDs is identified.

Optionally, the indication information may be used for identifying the location of each type of PSP-IDs through indicating one or more of a length, a location and a boundary of the type of PSP-IDs. For example, the location of each type of PSP-IDs may be acquired through indicating the length in combination with an arrangement order of all types. If the multiple PSP-IDs include a first type of PSP-IDs, a second type of PSP-IDs and a third type of PSP-IDs, and the first type of PSP-IDs, the second type of PSP-IDs and the third type of PSP-IDs are arranged in order, then in case that the length of each of the types is known, locations of various types of PSP-IDs may be determined, and thus the type of each PSP-ID is acquired. For example, the location of each type of PSP-IDs may be determined through indicating the location, and thereby the type of each PSP-ID is acquired. For example, the location of each type of PSP-IDs may be acquired through indicating the boundary in combination with the arrangement order of all types; if the multiple PSP-IDs include the first type of PSP-IDs, the second type of PSP-IDs, and the third type of PSP-IDs, and the the first type of PSP-IDs, the second type of PSP-IDs, and the third type of PSP-IDs are arranged in the order, then in case that the boundary of each type of PSP-IDs is known, the locations of the various types of the PSP-IDs may be determined, and thus the type of each PSP-ID is acquired.

Optionally, the indication information may include information for indicating start and end locations of each type of PSP-IDs among the multiple PSP-IDs; or the indication information may include information for indicating end locations of a first type of PSP-IDs to a last but one type of PSP-IDs arranged according to the preset sequential order among the multiple PSP-IDs; or the indication information may include information for indicating start locations of a second type of PSP-IDs to a last type of PSP-IDs arranged according to the preset sequential order among the multiple PSP-IDs.

For example, the SIB_MF supports 0-31 PSP-IDs and each of the PSP-IDs includes 24 bits, and a case in which there are three types of PSP-IDs is assumed, and the three types are represented by a first type, a second type and a third type, respectively. The abovementioned preset sequential order may be that an order of the three types of PSP-IDs in the SIB_MF is the first type, the second type and the third type in sequence, such as a PLMN PSP, an OID PSP and a hash PSP. Therefore, the indication information may include indication information of the start and end locations of each type of PSP-IDs. For example, as shown in FIG. 4, the indication information indicates the start and end locations of different types of PSP-IDs, and the start and end locations of each type of PSP-IDs may also be indicated directly through 5 bits (0-31 correspond to the locations of the PSP-IDs, respectively).

Certainly, in order to save bit overheads, adjacent types in the system message are arranged successively, that is to say, the end location of a previous type and the end location of a next type may be indicated once. Meanwhile, the start and end locations of an entirety of all PSP-IDs may be acquired through a coding result of a Radio Resource Control (RRC), and thus do not need to be indicated. Taking the SIB_MF for example, supposing that three types of PSP-IDs are supported, namely a first type, a second type and a third type which are successively arranged in the order. In such a case, the end location of the first type or the start location of the second type may be indicated through 5 bits, and the end location of the second type or the start location of the third type may be indicated through another 5 bits. The end location or the start location may be equivalent to a boundary between different ones of the types. For example, as shown in FIG. 5, only the end location of the first type or the start location of the second type, and the end location of the second type or the start location of the third type need to be indicated. The start location of the second type and the end location of the third type may be acquired through the coding structure of the RRC. Thus, only 730 bits, namely 24*30+(5+5), are needed for indicating 30 PSP-IDs according to some embodiments of the present disclosure.

An example of indicating PSP-IDs in a RRC signaling is shown by following codes, wherein a maximum number of PSP-IDs is 31 (maxPSP-SIB-MF=31. PSP-IdentityInfo is 24 bits):

PSP-Identity-SIB-MF-IEs information element

--ASN1START

PSP-Identity-SIB-MF-IEs::=SEQUENCE {

PSP-IdentityType-MF PSP-IdentityType-MF,

PSP-IdentityList-MF PSP-IdentityList-MF,

}

PSP-IdentityType-MF::=SEQUENCE {

PSP-IdentityType1-MF    INTEGER    (0..maxPSP-SIB-MF),

PSP-IdentityType2-MF    INTEGER    (0..maxPSP-SIB-MF),

}

PSP-IdentityList-MF::=SEQUENCE (SIZE (0..maxPSP-SIB-MF)) OF PSP-IdentityInfo

--ASN1STOP

Optionally, the indication information may be used for jointly indicating the end locations of the first type to the last but one type arranged according to the preset sequential order among the multiple PSP-IDs; or the indication information may be used for jointly indicating the start locations of the second type to the last type arranged according to the preset sequential order among the multiple PSP-IDs.

In some embodiments, since different types of PSP-IDs may be successively arranged in the order, dependency between two adjacent types may be simplified. Taking the three types of PSP-IDs for example, when the end location of the first type is K, the end location of the second type 2 probably is K to a maximum N, and the locations of the third type do not need to be additionally indicated by bits. Taking the SIB_MF maximally supporting 31 PSP-IDs for example, the start location of the first type is specified to be 0, the end location of the first type may have 32 possibilities, i.e., from 0 to 31, and the start location of the second type is determined by the end location of the first type. Thus, the end location of the second type may have 32 possibilities to zero possibility corresponding to the end location of the first type from 0 to 31, respectively, and formed into an arithmetic progression, i.e., totally have 512 possibilities (namely (32+0)*32/2), and the start and end locations of the types in different cases may be indicated through 9 bits. Therefore, the end locations of the first type to the last but one type arranged according to the preset sequential order among the multiple PSP-IDs may be jointly indicated; or the start locations of the second type to the last type arranged according to the preset sequential order among the multiple PSP-IDs may be jointly indicated, so as to save the overheads.

The example of indicating the PSP-IDs in the RRC signaling is shown by following codes, wherein the maximum number of the PSP-IDs is 31 (PSP-SIB-MF=31):

```
PSP-Identity-SIB-MF-IEs information element
--ASN1START
PSP-Identity-SIB-MF-IEs::=SEQUENCE {
PSP-IdentityType-MF PSP-IdentityType-MF,
PSP-IdentityList-MF PSP-IdentityList-MF.
}
PSP-IdentityType-MF::=BIT STRING (SIZE (9))
PSP-IdentityList-MF::=SEQUENCE (SIZE (0..maxPSP-SIB-MF)) OF PSP-IdentityInfo
--ASN1STOP
```

Optionally, when the system message includes at least one PSP-ID list, the PSP-IDs of the same type among PSP-IDs included in each of the at least one PSP-ID list are sequentially arranged, different types of PSP-IDs among the PSP-IDs included in each of the at least one PSP-ID list are arranged according to the preset sequential order, and each of the at least one PSP-ID list further includes the indication information of each type of PSP-IDs. The indication information is used for indicating a location of each type of PSP-IDs.

Some embodiments may be achieved through combining with the abovementioned embodiments. That is to say, the indication information included in each PSP-ID list may be any indication information introduced in the abovementioned embodiments.

In addition, it should be noted that a case in which the system message includes the at least one PSP-ID list is optional, that is to say, in some embodiments of the present disclosure, the system message may not include the at least one PSP-ID list.

Optionally, when the system message includes the at least one PSP-ID list, the PSP-IDs of the same type among the multiple PSP-IDs correspond to the same one of the at least one PSP-ID list, and the at least one PSP-ID list is arranged according to a preset sequential order, and the indication information is used for indicating the location of each of the at least one PSP-ID list.

In some embodiments, the PSP-IDs of the same type may be placed into the same PSP-ID list. The at least one PSP-ID list is arranged according to a preset sequential order, so that the type of each PSP-ID may be determined simply through identifying the location of each of the at least one PSP-ID list according to the indication information, and the overheads may be saved. For example, in some embodiments, the codes may be shown below:

```
PSP-Identity-SIB-MF-IE information element
--ASN1START
PSP-Identity-SIB-MF-IEs::=SEQUENCE {
PSP-IdentityListType1-MF PSP-IdentityList-MF.
PSP-IdentityListType2-MF PSP-IdentityList-MF,
PSP-IdentityListType3-MF PSP-IdentityList-MF,
}
PSP-IdentityList-MF::=SEQUENCE (SIZE (0..maxPSP-SIB-MF)) OF PSP-IdentityInfo
--ASN1STOP
```

Optionally, in order to meet a limitation of a maximum number of transmitted PSP-IDs in the system message, a sum of amounts of PSP-IDs in all types may be limited to be less than or equal to the maximum number being allowed. Taking the SIB_MF maximally supporting 31 PSP-IDs for example, it needs to specify that the sum of the amounts of PSP-IDs in the the three types is less than or equal to 31, which may be shown as follows by way of the RRC message:

```
PSP-Identity-SIB-MF-IE information element
--ASN1START
PSP-Identity-SIB-MF-IEs::=SEQUENCE {
PSP-IdentityListType1-MF      SEQUENCE      (PSP-IdentityListType1Size-MF) OF PSP-IdentityInfo,
PSP-IdentityListType2-MF      SEQUENCE      (PSP-IdentityListType2Size-MF) OF PSP-IdentityInfo,
PSP-IdentityListType3-MF      SEQUENCE      (PSP-IdentityListType3Size-MF) OF PSP-IdentityInfo,
}
PSP-IdentityListType1Size-MF::=SIZE(0..maxPSP-SIB-MF)
PSP-IdentityListType2Size-MF::=SIZE(0..(maxPSP-SIB-MF minus PSP-IdentityListType1Size-MF))
PSP-IdentityListType3Size-MF::=SIZE(0..(maxPSP-SIB-MF minus PSP-IdentityListType1Size-MF minus PSP-IdentityListType2Size-MF))
--ASN1STOP
```

Optionally, when the system message includes the at least one PSP-ID list, the PSP-IDs of the same type among the multiple PSP-IDs correspond to the same PSP-ID list, and the at least one PSP-ID list is arranged according to the preset sequential order, the indication information is used for indicating whether each of the at least one PSP-ID list corresponding to the preset sequential order appears or not.

For example, when the abovementioned preset sequential order corresponds to the the first type, the second type and the third type, the indication information may indicate whether lists corresponding to the first type, the second type and the type 3 appear or not. Since the order is known, for example the order takes a sequence of the first type, the second type and the third type, when all of the three types appear, the type of the PSP-IDs in the first list may be determined to be the first type, the type of the PSP-IDs in the second list may be determined to be the second type, and the type of the PSP-IDs in the third list may be determined to be the third type. For example, in some embodiments, the codes may be shown below:

```
PSP-Identity-SIB-MF-IE information element
--ASN1START
PSP-Identity-SIB-MF-IEs::=SEQUENCE {
PSP-IdentityListType-MF BIT STRING (SIZE (3)),
PSP-IdentityList-MF PSP-IdentityList-MF,
PSP-IdentityList-MF PSP-IdentityList-MF,
PSP-IdentityList-MF PSP-IdentityList-MF,
}
PSP-IdentityList-MF::=SEQUENCE (SIZE (0..maxPSP-SIB-MF)) OF PSP-Identity Info
--ASN1STOP
```

Optionally, in some embodiments, the amount of PSP-IDs included in the at least one PSP-ID list is less than or equal to a specified maximum number. Therefore, the amount of the PSP-IDs may be limited.

In some embodiments of the present disclosure, an access device generates the system message, the system message includes multiple PSP-IDs, PSP-IDs of the same type among the multiple PSP-IDs are sequentially arranged, and different types of PSP-IDs are arranged according to the preset sequential order, and the system message further includes indication information of each type of PSP-IDs, and the indication information is used for indicating the location of each type of PSP-IDs; and the access device transmits the system message. Compared with related art in which each PSP-ID needs to carry type indication information, some embodiments of the present disclosure may reduce the overheads for indicating the type of a PSP-ID.

Referring to FIG. 6, FIG. 6 is a flow diagram of another method for indicating the type of the PSP-ID provided by some embodiments of the present disclosure. As shown in FIG. 6, the method is executed by a User Equipment (UE) and includes a step S601.

S601, receiving a system message transmitted by an access device, wherein the system message includes multiple Participating Service Provider Identities (PSP-IDs), PSP-IDs of the same type among the multiple PSP-IDs are sequentially arranged, and different types of PSP-IDs are arranged according to a preset sequential order, and the system message further includes indication information of each type of PSP-IDs, and the indication information is used for indicating a location of each type of PSP-IDs.

Optionally, the indication information is used for identifying the location of each type of PSP-IDs through indicating one or more of a length, a location and a boundary of each type of PSP-IDs.

Optionally, the indication information includes information for indicating start and end locations of each type of PSP-IDs among the multiple PSP-IDs; or the indication information includes information for indicating end locations of a first type to a last but one type arranged according to the preset sequential order among the multiple PSP-IDs; or the indication information includes information for indicating start locations of a second type to a last type arranged according to the preset sequential order among the multiple PSP-IDs.

Optionally, the indication information is used for jointly indicating the end locations of the first type to the last but one type among the multiple PSP-IDs arranged according to the preset sequential order; or the indication information is used for jointly indicating the start locations of the second type to the last type among the multiple PSP-IDs arranged according to the preset sequential order.

Optionally, when the system message includes at least one PSP-ID list, PSP-IDs of a same type among PSP-IDs included in each of the at least one PSP-ID list are sequentially arranged, different types of PSP-IDs among the PSP-IDs included in each of the at least one PSP-ID list are arranged according to the preset sequential order, and each of the at least one PSP-ID list further includes the indication information of each type of PSP-IDs, the indication information is used for indicating the location of each type of PSP-IDs.

Optionally, when the system message includes the at least one PSP-ID list, the PSP-IDs of the same type among the multiple PSP-IDs correspond to the same PSP-ID list, and the at least one PSP-ID list is arranged according to the preset sequential order, the indication information is used for indicating the location corresponding to each of the at least one PSP-ID list.

Optionally, when the system message includes the at least one PSP-ID list, the PSP-IDs of the same type among the multiple PSP-IDs correspond to the same PSP-ID list, and the at least one PSP-ID list is arranged according to the preset sequential order, the indication information is used for indicating whether each of the at least one PSP-ID list corresponding to the preset sequential order appears or not.

Optionally, an amount of PSP-IDs included in the at least one PSP-ID list is less than or equal to a specified maximum number.

It should be illustrated that, the method is described by taking the UE as a main body and corresponds to some embodiments as shown in FIG. 3, specific implementation and beneficial effects of the method may refer to description of some embodiments as shown in FIG. 3, and detailed description thereof will be omitted.

Figure 7:
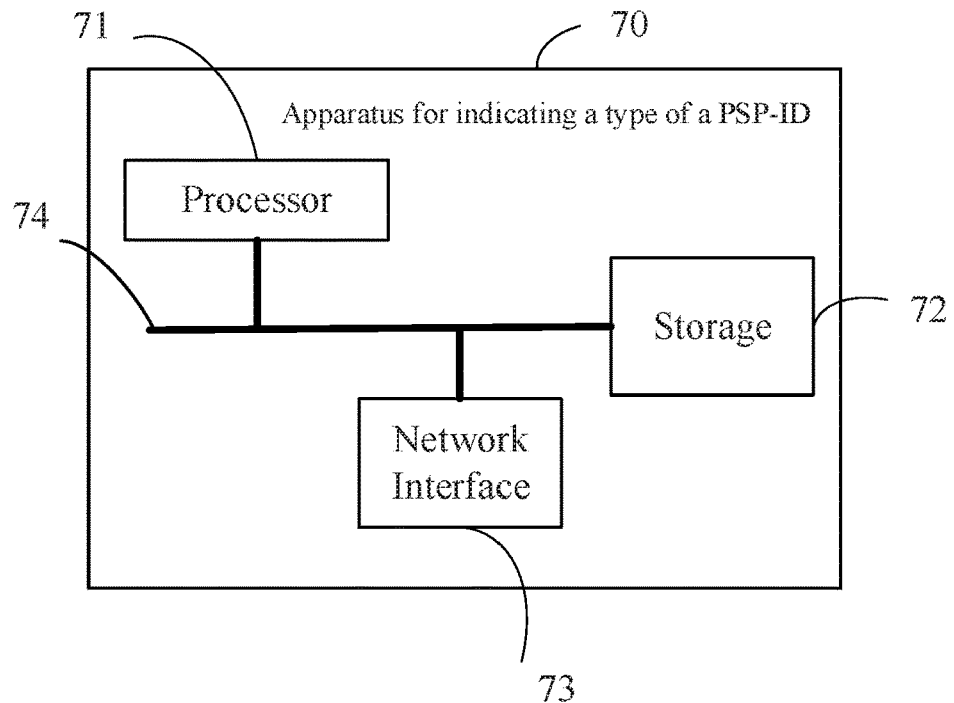
FIG. 7 is a structure schematic diagram of an apparatus for indicating a type of a PSP-ID provided by some embodiments of the present disclosure.

Referring to FIG. 7, FIG. 7 is a structure schematic diagram of an apparatus for indicating a type of a PSP-ID provided by some embodiments of the present disclosure. As shown in FIG. 7, the apparatus 70 for indicating the type of the PSP-ID includes a processor 71, a storage 72, a network interface 73 and a data bus 74, wherein the data bus 74 is used for connecting the processor 71, the storage 72 and the network interface 73 together; the storage 72 is used for storing programs and codes: the processor 71 is used for invoking the program and the codes stored in the storage 72 so as to execute steps as follow: (1) generating a system message, and (2) transmitting the system message, wherein the system message includes multiple participating service provider identities (PSP-IDs), PSP-IDs of a same type among the multiple PSP-IDs are sequentially arranged, and different types of PSP-IDs among the multiple PSP-IDs are arranged according to a preset sequential order; and the system message further includes indication information for each type of PSP-IDs, and the indication information is used for indicating a location of each type of PSP-IDs.

Optionally, the indication information is used for identifying the location of each type of PSP-IDs through indicating one or more of a length, a location and a boundary of each type of PSP-IDs.

Optionally, the indication information includes information for indicating start and end locations of each type of PSP-IDs among the multiple PSP-IDs; or the indication information includes information for indicating end locations of a first type of PSP-IDs to a last but one type of PSP-IDs arranged according to the preset sequential order among the multiple PSP-IDs; or the indication information includes information for indicating start locations of a second type of PSP-IDs to a last type of PSP-IDs arranged according to the preset sequential order among the multiple PSP-IDs.

Optionally, the indication information is used for jointly indicating the end locations of the first type to the last but one type arranged according to the preset sequential order among the multiple PSP-IDs: or the indication information is used for jointly indicating the start locations of the second type to the last type arranged according to the preset sequential order among the multiple PSP-IDs.

Optionally, when the system message includes at least one PSP-ID list, the PSP-IDs of a same type among the multiple PSP-IDs included in each of the at least one PSP-ID list are sequentially arranged, different types of PSP-IDs among the multiple PSP-IDs are arranged according to the preset sequential order, and each of the at least one PSP-ID list further includes the indication information of each type of PSP-IDs. The indication information is used for indicating a location of each type of PSP-IDs.

Optionally, when the system message includes the at least one PSP-ID list, the PSP-IDs of the same type among the multiple PSP-IDs correspond to the same PSP-ID list, and the at least one PSP-ID list is arranged according to the preset sequential order, and the indication information is used for indicating the location of each of the at least one PSP-ID list.

Optionally, when the system message includes the at least one PSP-ID list, the PSP-IDs of the same type among the multiple PSP-IDs correspond to the same PSP-ID list, and the at least one PSP-ID list is arranged according to the preset sequential order, the indication information is used for indicating whether each of the at least one PSP-ID list corresponding to the preset sequential order appears or not.

Optionally, the amount of PSP-IDs included in the at least one PSP-ID list is less than or equal to a specified maximum number.

In some embodiments, the apparatus for indicating the type of the PSP-ID may implement each step implemented by the access device in the method shown in FIG. 3 to FIG. 6, and same beneficial effects may be attained, and detailed description thereof will be omitted.

Some embodiments of the present disclosure further provide an access device including the apparatus for indicating the type of the PSP-ID provided by some embodiments shown in FIG. 7. The access device may be a base station or an access point (AP). It may be understood that a form of the base station is not limited, and the base station may be a Macro Base Station, a Pico Base Station, a Node B (a 3G base station), an enhanced Node B (ENB), a Femto eNB or a home eNode B or a Home eNB or an HNEB, a relay station, a Remote Radio Unit (RRU) or a Remote Radio Head (RRH), etc.

Figure 8:
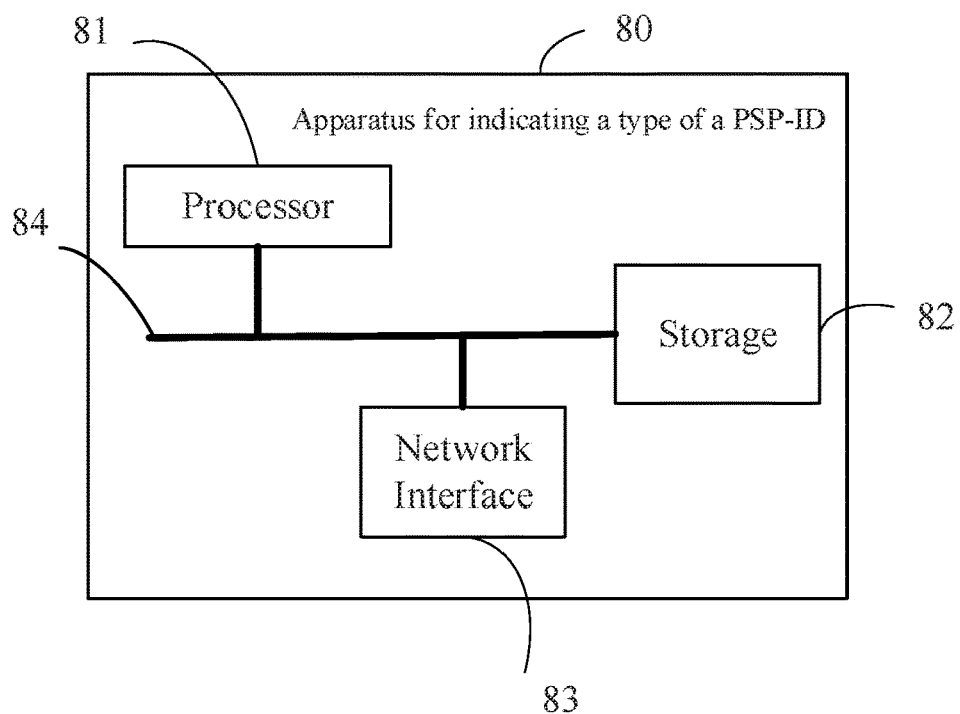
FIG. 8 is a structure schematic diagram of another apparatus for indicating a type of a PSP-ID provided by some embodiments of the present disclosure.

Referring to FIG. 8, FIG. 8 is a structure schematic diagram of another apparatus for indicating a type of a PSP-ID provided by some embodiments of the present disclosure. As shown in FIG. 8, the apparatus 80 for indicating the type of the PSP-ID includes a processor 81, a storage 82, a network interface 83 and a data bus 84, wherein the data bus 84 is used for connecting the processor 81, the storage 82 and the network interface 83 together; the storage 82 is used for storing programs and codes; the processor 81 is used for invoking the program and the codes stored in the storage 82 so as to execute steps as follow: receiving a system message transmitted by an access device, wherein the system message includes multiple Participating Service Provider Identities (PSP-IDs), PSP-IDs of a same type among the multiple PSP-IDs are sequentially arranged, and different types of PSP-IDs are arranged according to a preset sequential order, and the system message further includes indication information of each type of PSP-IDs, and the indication information is used for indicating a location of each type of PSP-IDs.

Optionally, the indication information is used for identifying the location of each type of PSP-IDs through indicating one or more of a length, a location and a boundary of each type of PSP-IDs.

Optionally, the indication information includes information for indicating start and end locations of each type of PSPs among the multiple PSP-IDs; or the indication information includes information for indicating end locations of a first type to a last but one type arranged according to the preset sequential order among the multiple PSP-IDs; or the indication information includes information for indicating start locations of a second type to a last type arranged according to the preset sequential order among the multiple PSP-IDs.

Optionally, the indication information is used for jointly indicating the end locations of the first type to the last but one type arranged according to the preset sequential order among the multiple PSP-IDs; or the indication information is used for jointly indicating the start locations of the second type to the last type arranged according to the preset sequential order among the multiple PSP-IDs.

Optionally, when the system message includes at least one PSP-ID list, PSP-IDs of a same type among the multiple PSP-IDs included in each of the at least one PSP-ID list are sequentially arranged, different types of PSP-IDs among the multiple PSP-IDs are arranged according to the preset sequential order, and each of the at least one PSP-ID list further includes the indication information of each type of PSP-IDs, the indication information is used for indicating the location of each type of PSP-IDs.

Optionally, when the system message includes the at least one PSP-ID list, the PSP-IDs of the same type among the multiple PSP-IDs correspond to the same PSP-ID list, and the at least one PSP-ID list is arranged according to the preset sequential order, the indication information is used for indicating the location corresponding to each of the at least one PSP-ID list.

Optionally, when the system message includes the at least one PSP-ID list, the PSP-IDs of the same type among the multiple PSP-IDs correspond to the same PSP-ID list, and the at least one PSP-ID list is arranged according to the preset sequential order, the indication information is used for indicating whether each of the at least one PSP-ID list corresponding to the preset sequential order appears or not.

Optionally, an amount of PSP-IDs included in the at least one PSP-ID list is less than or equal to a specified maximum number.

In some embodiments, the apparatus for indicating the type of the PSP-ID may implement each step implemented by the UE in the method shown in FIG. 3 to FIG. 6, and attain the same beneficial effects. Detailed description thereof is not repeated herein.

Some embodiments of the present disclosure further provide a User Equipment (UE) including the apparatus for indicating the PSP-IDs provided by some embodiments shown in FIG. 8. The UE may be a terminal product capable of supporting a communication protocol of a land mobile communication system or a wireless modem applied to specific communication, which may be integrated into various kinds of terminals such as a mobile phone, a tablet computer and a data card to achieve a communication function. For example, the UE may be a mobile phone or other equipments that may send or receive a wireless signal, such as a personal digital assistant (PDA), a wireless modem, a wireless communication device, a handheld device, a laptop computer, a cordless telephone, a wireless local loop (WLL) station, a Customer Premise Equipment (CPE) or a mobile intelligent hotspot capable of transforming a mobile signal into a WiFi signal, an intelligent household appliance, or other equipments that may autonomously communicate with the mobile communication network without artificial operation.

It should be understood that in various embodiments of the present disclosure, serial numbers of above steps do not mean a precedence order of executing the step, and an order for executing the steps should be determined according to functions and internal logic thereof, and should not limit implementation processes of some embodiments of the present disclosure. In addition, terms such as "system" and "network" used herein may be often interchanged. It should be understood that the terms such as "and/or" used herein are only used for describing relationship of associated objects, and may express that three kinds of relations. For example, A and/or B may express three cases: A exists only, A and B exist concurrently, and B exists only. In addition, a character "/" used herein generally expresses that objects before and after the character have an "or" relation between them. It should be understood that in some embodiments provided by the present disclosure, an expression "B corresponding to A" expresses that B is associated with A, and B may be determined according to A. However, it should also be understood that a case in which B may be determined according to A does not mean a case in which B may only be determined according to A, but mean a case in which B may also be determined according to A and/or other information.

It should be understood that the methods and apparatuses disclosed by the embodiments in the present disclosure may be implemented in other ways. For example, the apparatus described above are only exemplary. For example, a division of units is only a division in terms of logic functions, and other divisions may exist in actual conditions. For example, multiple units or components may be combined or integrated into another system, or some characteristics may be omitted or not executed. In addition, displayed or discussed mutual coupling or direct coupling or communication connection may be an indirection coupling or a communication connection via some interfaces, devices or units, and may be electrical couplings or connections, mechanical coupling or connections or other coupling or connections.

In addition, each function unit in the embodiments of the present disclosure may be integrated into one processing unit, or may be physically included in separated processing units, or two or more units may also be integrated into one unit. The integrated unit may be achieved by hardware, by software, or by hardware and software. The integrated unit achieved by software may be stored in a computer readable storage medium. The software is stored in a storage medium, and includes multiple instructions configured to cause a computer equipment (which may be a personal computer, a server or a network equipment, etc.) to execute a part of receiving and transmitting steps in the methods provided by some embodiments of the present disclosure. The above-mentioned storage medium may be any medium capable of storing programs and codes, such as a USB flash disk, a mobile hard disk, a Read-Only Memory (ROM), a Random Access Memory (RAM), a magnetic disk or an optical disk, etc.

The above are optional embodiments of the present disclosure. It should be understood that some modifications and embellishments may also be made by those skilled in the art without departing from the principles of the present disclosure. The modifications and embellishments also fall within the scope of the present disclosure.

What is claimed is:

1. A method for indicating a type of a participating service provider identity, comprising:
   generating a system message by an access device, wherein the system message comprises multiple participating service provider identities (PSP-IDs) of different participating service providers in a network, PSP-IDs of a same type among the multiple PSP-IDs are sequentially arranged, and different types of PSP-IDs among the multiple PSP-IDs are arranged according to a preset sequential order, and the system message further comprises indication information for each type of PSP-IDs, and the indication information is used for indicating a location of each type of PSP-IDs through indicating at least one of a length, a location and a boundary of the type of PSP-IDs; and
   transmitting the system message by the access device.

2. The method according to claim 1, wherein the indication information comprises information for indicating start and end locations of each type of PSP-IDs among the multiple PSP-IDs; or
   the indication information comprises information for indicating end locations of a first type of PSP-IDs to a last but one type of PSP-IDs arranged according to the preset sequential order among the multiple PSP-IDs; or
   the indication information comprises information for indicating start locations of a second type of PSP-IDs to a last type of PSP-IDs arranged according to the preset sequential order among the multiple PSP-IDs.

3. The method according to the claim 1, wherein the indication information is used for jointly indicating end locations of a first type of PSP-IDs to a last but one type of PSP-IDs arranged according to the preset sequential order among the multiple PSP-IDs; or
   the indication information is used for jointly indicating start locations of a second type of PSP-IDs to a last type of PSP-IDs arranged according to the preset sequential order among the multiple PSP-IDs.

4. The method according to claim 1, wherein when the system message comprises at least one PSP-ID list, PSP-IDs of a same type among PSP-IDs comprised in each of the at least one PSP-ID list are sequentially arranged, different types of PSP-IDs among the PSP-IDs included in each of the at least one PSP-ID list are arranged according to the preset sequential order, and each of the at least one PSP-ID list further comprises the indication information of each type of PSP-IDs, and the indication information is used for identifying the location of each type of PSP-IDs.

5. The method according to claim 1, wherein when the system message comprises at least one PSP-ID list, PSP-IDs of a same type among the multiple PSP-IDs correspond to a same one of the at least one PSP-ID list, and the at least one PSP-ID list is arranged according to the preset sequential order, and the indication information is used for indicating a location of each of the at least one PSP-ID list.

6. The method according to claim 1, wherein when the system message comprises at least one PSP-ID list, PSP-IDs of a same type among the multiple PSP-IDs correspond to a same one of the at least one PSP-ID list, and the at least one PSP-ID list is arranged according to the preset sequential order, the indication information is used for indicating whether each of the at least one PSP-ID list corresponding to the preset sequential order appears or not.

7. The method according to claim 5, wherein an amount of PSP-IDs comprised in the at least one PSP-ID list is less than or equal to a specified maximum number.

8. A method for indicating a type of a participating service provider identity (PSP-ID), the method being executed by a User Equipment (UE) and comprising:
   receiving a system message transmitted by an access device, wherein the system message comprises multiple PSP-IDs through indicating at least one of a length, a location and a boundary of the type of PSP-IDs, PSP-IDs of a same type among the multiple PSP-IDs are sequentially arranged, and different types of PSP-IDs are arranged according to a preset sequential order, and the system message further comprises indication information of each type of PSP-IDs, and the indication information is used for indicating a location of each type of PSP-IDs IDs through indicating at least one of a length, a location and a boundary of the type of PSP-IDs.

9. The method according to claim 8, wherein the indication information comprises information for indicating start and end locations of each type of PSP-IDs among the multiple PSP-IDs; or
   the indication information comprises information for indicating end locations of a first type of PSP-IDs to a last but one type of PSP-IDs arranged according to the preset sequential order among the multiple PSP-IDs; or
   the indication information comprises information for indicating start locations of a second type of PSP-IDs to a last type of PSP-IDs arranged according to the preset sequential order among the multiple PSP-IDs.

10. The method according to the claim 8, wherein the indication information is used for jointly indicating end locations of a first type of PSP-IDs to a last but one type of PSP-IDs arranged according to the preset sequential order among the multiple PSP-IDs; or the indication information is used for jointly indicating start locations of a second type of PSP-IDs to a last type of PSP-IDs arranged according to the preset sequential order among the multiple PSP-IDs.

11. The method according to claim 8, wherein when the system message comprises at least one PSP-ID list, PSP-IDs of a same type among PSP-IDs comprised in each of the at least one PSP-ID list are sequentially arranged, different types of PSP-IDs among the PSP-IDs comprised in each of the at least one PSP-ID list are arranged according to the preset sequential order, and each of the at least one PSP-ID list further comprises the indication information of each type of PSP-IDs, the indication information is used for identifying the location of each type of PSP-IDs.

12. The method according to claim 8, wherein when the system message comprises at least one PSP-ID list, PSP-IDs of a same type among the multiple PSP-IDs correspond to a same one of the at least one PSP-ID list, and the at least one PSP-ID list is arranged according to the preset sequential order, the indication information is used for indicating a location of each of the at least one PSP-ID list.

13. The method according to claim 8, wherein when the system message comprises at least one PSP-ID list, PSP-IDs of a same type among the multiple PSP-IDs correspond to a same one of the at least one PSP-ID list, and the at least one PSP-ID list is arranged according to the preset sequential order, the indication information is used for indicating whether each of the at least one PSP-ID list corresponding to the preset sequential order appears or not.

14. The method according to claim 12, wherein an amount of PSP-IDs comprised in the at least one PSP-ID list is less than or equal to a specified maximum number.

15. An apparatus for indicating a type of a Participating Service Provider Identity (PSP-ID), comprising:

a processor, a storage, a network interface and a data bus, wherein the data bus is configured to connect the processor, the storage and the network interface together; the storage is configured to storing programs and codes; and the processor is configured to invoke the program and the codes stored by the storage so as to execute the method according to claim 1.

16. The apparatus according to claim 15, wherein the indication information is used for identifying the location of each type of PSP-IDs through indicating at least one of a length, a location and a boundary of the type of PSP-IDs.

17. An apparatus for indicating a type of a Participating Service Provider Identity (PSP-ID), comprising:

a processor, a storage, a network interface and a data bus, wherein the data bus is configured to connect the processor, the storage and the network interface together; the storage is configured to storing programs and codes; and the processor is configured to invoke the program and the codes stored by the storage so as to execute the method according to claim 8.

18. The apparatus according to claim 17, wherein the indication information is used for identifying the location of each type of PSP-IDs through indicating at least one of a length, a location and a boundary of each type of PSP-IDs.

* * * * *